Figure 1:
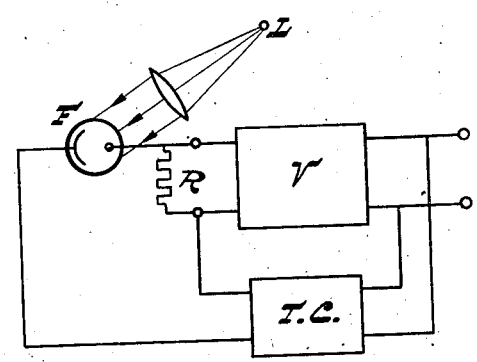

May 10, 1949.  M. J. O. STRUTT ET AL  2,469,852
METHOD OF OPERATING PHOTOELECTRIC DEVICES
Filed July 16, 1946

INVENTORS
MAXIMILIAAN JULIUS OTTO STRUTT
ALDERT VAN DER ZIEL
BY
AGENT

Patented May 10, 1949

2,469,852

UNITED STATES PATENT OFFICE 2,469,852

METHOD OF OPERATING PHOTOELECTRIC DEVICES

Maximiliaan Julius Otto Strutt and Aldert van der Ziel, Eindhoven, Netherlands, assignors to Hartford National Bank and Trust Company, Hartford, Conn., as trustee Application July 16, 1946, Serial No. 684,091
In the Netherlands December 4, 1942

Section 1, Public Law 690, August 8, 1946
Patent expires December 4, 1962

3 Claims. (Cl. 250—41.5)

This invention relates to a photo-electric device comprising a source of light and a photo-electric cell converting the light variations originating from the light source into voltage variations through a resistance included in the circuit of the photo-electric cell, which voltage variations are supplied to an amplifier, the output circuit of which is coupled with the photo-electric cell via a negative feed-back circuit.

The use of negative feed-back in photo-cell amplifiers is already known from American patent specification 1,864,670; in this case the negative feed-back is used to eliminate some distortions of the combination photocell-amplifier. In American patent specification 2,082,627 an increase in amplification is obtained by utilizing positive feed-back, though in the said patent specification the possibility of negative feed-back is also mentioned.

The present invention has for its purpose to raise the signal-to-noise ratio in the output circuit of a photo-cell amplifier.

According to the invention this object is attained with the aid of a device of the above-stated kind if the intensity of the light incident upon the photo-electric cell is greater than that which corresponds to the normally permissible lighting and the negative feed-back is such that the variations in current produced in the photo-electric cell are limited to the permissible maximum.

With a given intensity of the light variations incident upon a photo-electric cell there will occur a definite signal-to-noise ratio in the output circuit of the amplifier coupled with the photo-electric cell, if no use is made of negative feed-back. In order to increase this ratio as much as possible, it is desirable that the light variations incident on the photo-electric cell should be given as high a value as possible. This is bound to a certain limit, however, since, as is well-known, the photo-electric current in a photo-electric cell must not exceed a definite value, as otherwise so-called fatigue phenomena occur, that is to say the photo-electric current decreases with time under otherwise unvaried conditions. Consequently, the incident light intensity must not exceed a normally permissible lighting. When the photo-electric cell is adjusted to a point such that the variations in photo-current resulting from the incident variations in light intensity bring about approximately proportional variations in the voltage of the photo-electric cell, the signal-to-noise ratio will not change by the use of negative feed-back. However, due to the negative feed-back, which brings about a decrease of the photo-electric current, an increase in intensity of the incident light is now rendered possible, thus enabling the signal-to-noise ratio to be raised.

The explanation following hereinafter will make this clearer.

Assuming that $I_a$ is the photo-electric current which without the use of negative feed-back occurs due to the maximum permissible light intensity which may fall upon the photo-electric cell. The average of the quadrate of the variations in the photo-electric current is proportional with the photo-electric current $I_a$. Consequently, the noise existing in this photo-electric current will be proportional with $\sqrt{I_a}$, for example $C\sqrt{I_a}$.

If, now, the signal is increased by a factor $n$ the photo-electric current, if it remained proportional with the incident light intensity, would become $nI_a$ and hence the noise $C\sqrt{I_a}$. Since the photo-electric cell is now overloaded $n$ times, use is made of negative feed-back, so that the photo-electric current again acquires the value $I_a$. However, since the signal-to-noise ratio does not change through negative feed-back the noise now becomes $$\frac{C}{n}\sqrt{nI_a}$$

Due to the negative feed-back, the noise has consequently decreased $n$ times.

The invention will be explained more fully by reference to the accompanying drawing showing two constructional examples of a photo-electric device according thereto.

In the circuit shown in Fig. 1 the variation in light intensity, originating from a light source L, of the signal incident on the photo-electric cell F is converted into a current variation which brings about a voltage variation at the input end of an amplifier V via a resistance R. The amplified voltage is supplied to a negative feed-back circuit TC coupled with the photo-electric cell.

Figure 2:
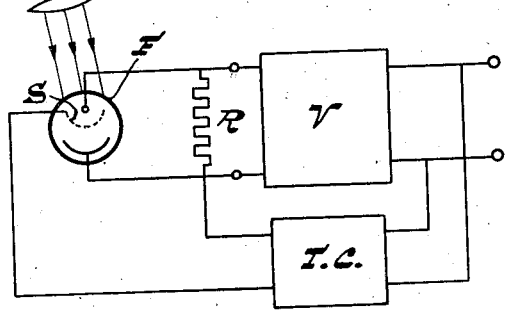

It is also possible to supply the negative feed-back voltage to a grid arranged in the photo-electric cell, as is shown in Fig. 2. The negative feed-back voltage is now supplied to the control grid S arranged between the anode and the cathode of the photo-electric cell F.

What we claim is:

1. The method of operating a photo-electric cell having a maximum permissible current production to obtain an improved signal-to-noise ratio comprising the steps of exciting said cell with a signal light having a variable intensity which varies beyond a predetermined intensity above which value said intensity ordinarily reacts on said photo-electric cell to produce a current therein greater than said predetermined maximum permissible current, amplifying the resultant output of the excited cell, and degeneratively feeding back to said cell a portion of the amplified output of said cell to a degree limiting the current in said cell to said predetermined maximum permissible current.

2. The method of operating a photo-electric cell having a maximum permissible current production to obtain an improved signal-to-noise ratio comprising the steps of exciting said cell with a signal light having a variable intensity which varies beyond a predetermined intensity above which value said intensity ordinarily reacts on said photo-electric cell to produce a current therein greater than said predetermined maximum permissible current, amplifying the resultant output of the excited cell, deriving a negative feedback voltage from the amplified output of the excited cell, and applying said negative feedback voltage as a bias on said cell to a degree limiting the current therein to said predetermined maximum permissible current.

3. The method of operating a photo-electric cell provided with a control electrode and having a maximum permissible current production to obtain an improved signal-to-noise ratio comprising the steps of exciting said cell with a signal light having a variable intensity which varies beyond a predetermined intensity above which value said intensity ordinarily reacts on said photo-electric cell to produce a current therein greater than said predetermined maximum permissible current, amplifying the resultant output of the excited cell, deriving a negative feedback voltage from the amplified output of said cell, and applying said negative feedback voltage to the control electrode of said cell to a degree limiting the current in said cell to said predetermined maximum permissible current.

MAXIMILIAAN JULIUS OTTO STRUTT.
ALDERT van der ZIEL.

REFERENCES CITED

The following references are of record in the file of this patent:

UNITED STATES PATENTS

| Number | Name | Date |
|---|---|---|
| 1,809,676 | Culver | June 9, 1931 |
| 2,082,627 | Haugh | June 1, 1937 |